(12) United States Patent
Gagliardi, Jr. et al.

(10) Patent No.: US 7,740,528 B1
(45) Date of Patent: Jun. 22, 2010

(54) APPARATUS FOR CUTTING ELONGATED MEAT

(75) Inventors: Eugene D. Gagliardi, Jr., Cochranville, PA (US); Chad Allen Thompson, Holdingford, MN (US)

(73) Assignee: Skippack Creek Corporation, Wilmington, DE (US)

( * ) Notice: Subject to any disclaimer, the term of this patent is extended or adjusted under 35 U.S.C. 154(b) by 0 days.

(21) Appl. No.: 12/335,908

(22) Filed: Dec. 16, 2008

(51) Int. Cl.
*A22C 18/00* (2006.01)
(52) U.S. Cl. ...................................... 452/149
(58) Field of Classification Search ................ 452/149; 30/299, 301–304, 90.1; 99/537; 83/973, 83/885, 932
See application file for complete search history.

(56) References Cited

U.S. PATENT DOCUMENTS

| | | | | | |
|---|---|---|---|---|---|
| 1,825,628 | A | * | 9/1931 | Floyd et al. | 99/553 |
| 1,825,629 | A | * | 9/1931 | Floyd | 99/553 |
| 2,540,014 | A | * | 1/1951 | Smith | 99/509 |
| 4,111,112 | A | * | 9/1978 | Altman | 99/538 |
| 4,118,828 | A | * | 10/1978 | Melanson | 452/50 |
| 4,958,547 | A | * | 9/1990 | Low | 83/873 |
| 5,069,914 | A | | 12/1991 | Gagliardi, Jr. | |
| 5,241,902 | A | * | 9/1993 | Gangi | 99/538 |
| 5,746,106 | A | * | 5/1998 | Hodges | 83/884 |
| 5,771,771 | A | | 6/1998 | Gagliardi, Jr. | |
| 5,976,585 | A | | 11/1999 | Gagliardi, Jr. | |
| 6,248,013 | B1 | | 6/2001 | Thomas et al. | |

* cited by examiner

*Primary Examiner*—Thomas Price
(74) *Attorney, Agent, or Firm*—Sheridan Ross, P.C.

(57) ABSTRACT

An apparatus for cutting elongated meat includes a frame that has a longitudinal axis and a motor proximate the frame. At least two generally circular blades are rotatably mounted to the frame each about a respective blade axis. Each blade axis is generally perpendicular to the longitudinal axis. The blades axes are positioned generally on an imaginary plane generally perpendicular to the longitudinal axis. The blades are rotated by the motor and cut the elongated meat when the elongated meat is placed generally collinear with the longitudinal axis and contacts the blades.

22 Claims, 6 Drawing Sheets

APPARATUS FOR CUTTING ELONGATED MEAT

BACKGROUND OF THE INVENTION

This invention generally relates to an apparatus for cutting elongated meat and, more particularly, to an apparatus for cutting elongated meat into a plurality of separated strips.

In the preparation of meat products, it is useful to process relatively larger portions of meat, such as a pre-manufactured hot-dog or sausage, into smaller portions or strips of meat. Such individual strips of meat can be used to form many meat products. For example, the individual strips of meat can be battered, breaded and fried to form a "fun" to eat French fry type of meat product.

Slicing meat into various relatively small portion of meat is a time consuming and tedious process when carried out by hand. Additionally, the size of the sliced portions will vary and is difficult to keep consistent and to produce a large quantity. More problematic is the inherent danger in using a knife or other sharp cutting device to manually slice a portion of meat, as the knife can easily slip from the meat and cut the hand and/or other parts of the person cutting the meat. Known automated meat cutters have difficulty centering the meat with respect to the cutting blades.

What is needed is an apparatus capable of safely, simply and rapidly processing portions of meat into smaller pieces of meat.

BRIEF SUMMARY OF THE INVENTION

Briefly stated, the present invention is directed to an apparatus for cutting elongated meat that includes a frame having a longitudinal axis and a motor proximate the frame. At least two generally circular blades are rotatably mounted to the frame each about a respective blade axis. Each blade axis is generally perpendicular to the longitudinal axis. The blades axes are positioned generally on an imaginary plane generally perpendicular to the longitudinal axis. The blades are rotated by the motor and cut the elongated meat when the elongated meat is placed generally collinear with the longitudinal axis and contacts the blades.

In another aspect, the present invention is directed to an apparatus for cutting elongated meat having a frame that has a longitudinal axis. A plurality of generally circular blades are rotatably mounted to the frame each about a respective blade axis. Each bade axis is generally perpendicular to the longitudinal axis. The blade axes are positioned generally on an imaginary plane generally perpendicular to the longitudinal axis. The blades are generally equally spaced around the longitudinal axis and each rotate in a direction to pull the elongated meat along the longitudinal axis. The blades cut the elongated meat as the elongated meat travels along the longitudinal axis.

In another aspect, the present invention is directed to an apparatus for cutting elongated meat that has a frame having a longitudinal axis. Eight generally circular blades are rotatably mounted to the frame about a respective axis on a respective axle. Each axle has a first beveled gear. Each bade axis is generally perpendicular to the longitudinal axis. The blade axes are positioned generally on an imaginary plane generally perpendicular to the longitudinal axis. The blades are generally equally circumferentially spaced around the longitudinal axis at approximately a forty five degree angle from each adjacent blade. Each blade rotating in a direction to pull the elongated meat along the longitudinal axis. Eight drive axles are rotatably mounted to the frame generally parallel to the longitudinal axis. Each drive axle has a second bevel gear drivingly connected to a respective first bevel gear. Each drive axle has a belt gear. The belt gears are rotatably driven by a belt.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
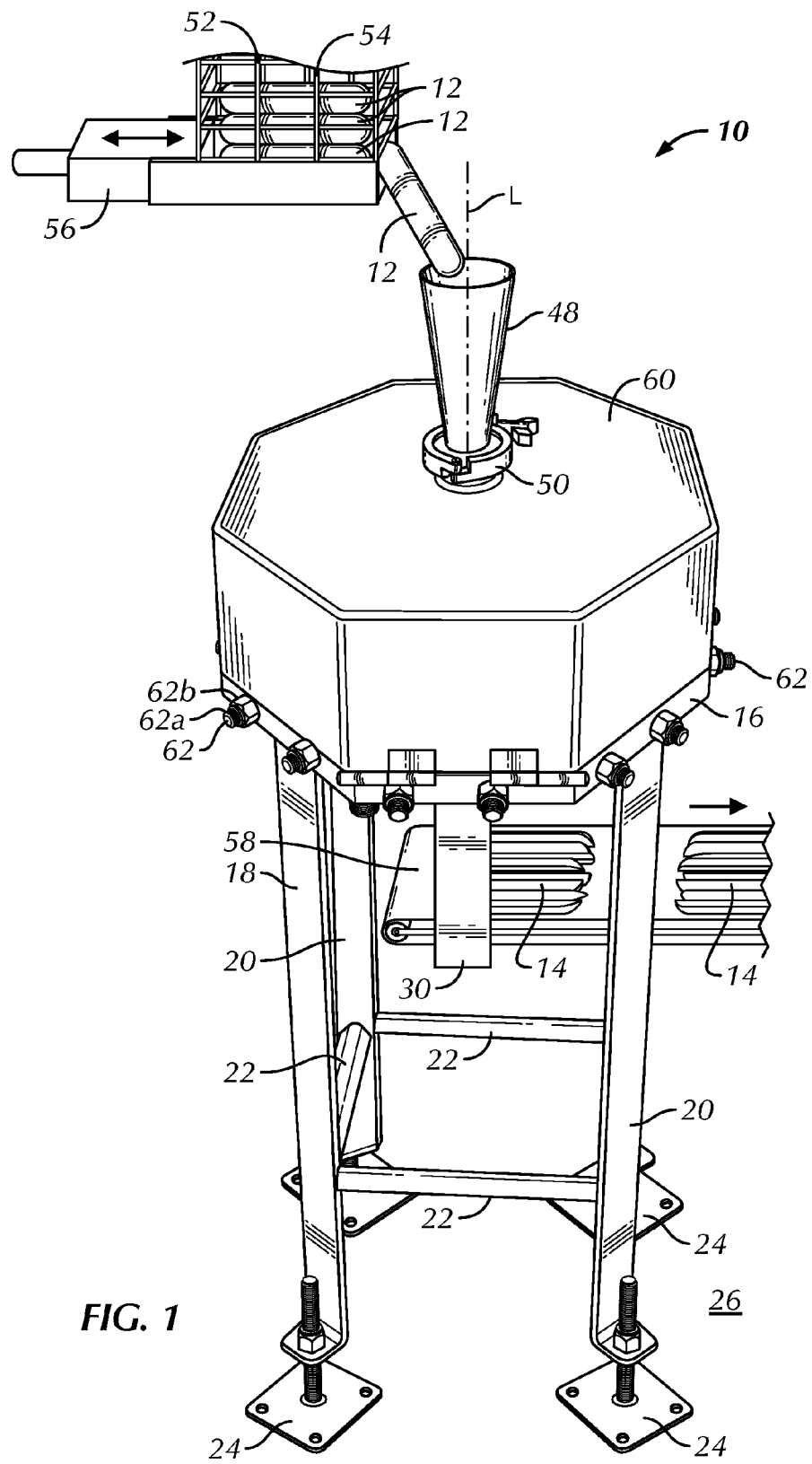
FIG. 1 is a perspective view of an apparatus for cutting elongated meat in accordance with a preferred embodiment of the present invention.
Figure 2A:
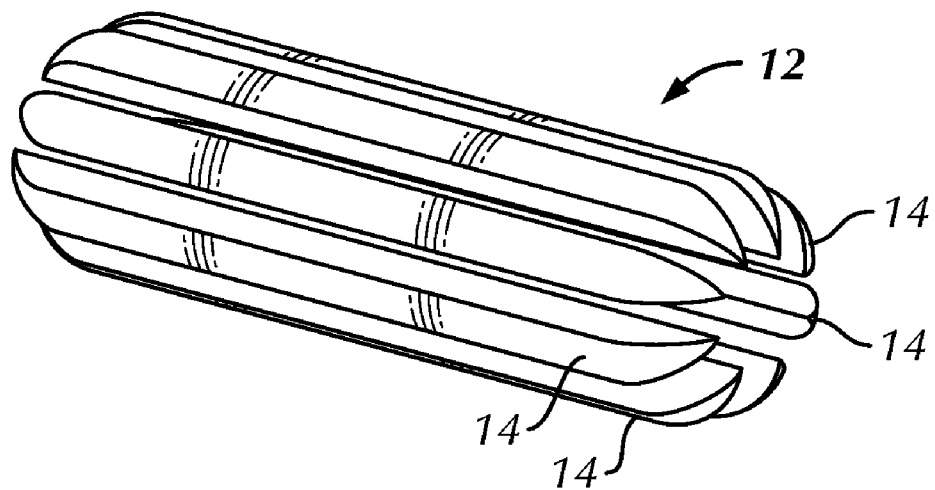
FIG. 2A is a perspective view of the elongated meat piece cut into elongated strips of meat by the apparatus shown in FIG. 1.
Figure 2B:
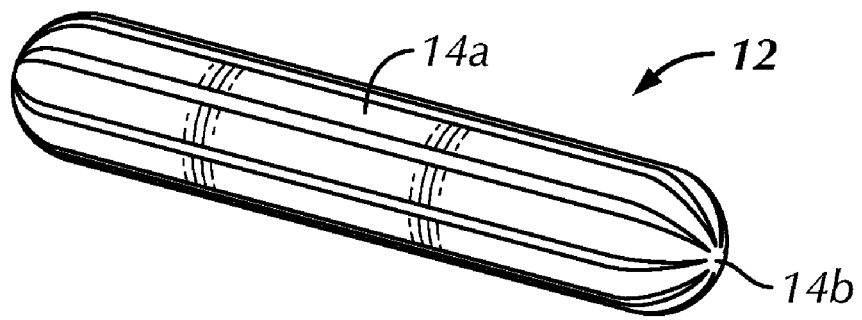
FIG. 2B is a perspective view of the elongated meat piece slit into eight sections held together by an uncut central core by the apparatus shown in FIG. 1.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of an apparatus for cutting elongated meat in accordance with the present invention, and designated parts thereof. Unless specifically set forth herein, the terms "a", "an" and "the" are not limited to one element but instead should be read as meaning "at least one". The terminology includes the words noted above, derivatives thereof and words of similar import.

Referring to the drawings in detail, wherein like reference numerals indicate like elements throughout, there is shown in FIGS. 1-5B a preferred embodiment of an apparatus, generally designated 10, for cutting elongated meat in accordance with the present invention. The apparatus 10 is for cutting an elongated piece of meat 12 into at least two, but preferably eight, separated elongated strips of meat 14, each strip of meat 14 having a cross section generally in the shape of a pie wedge. Alternatively, referring to FIG. 2B, the apparatus 10 may cut the elongated meat 12 into a plurality of sections of meat 14a connected by an uncut core 14b such that the sections of meat 14a remain connected until separated during processing, by end user or are not separated at all. The apparatus 10 preferably processes or cuts elongated pieces of meat 12 such as hot dogs, worsts, sausages or any other similarly shaped meats. However, the apparatus 20 can also be used with foods, other than meat, having properties, such as texture or cohesion, that are relatively similar to those of meat such as tofu.

Referring to FIG. 1, the apparatus 10 includes a frame 16 having a longitudinal axis L. The frame 16 is preferably constructed of stainless steel. However, the frame 16 can be constructed of any suitably strong, durable and non-corrosive material such as aluminum or some other metal or alloy. The frame 16 preferably includes a support stand 18 that elevates the frame 16 above a support surface 26 such as a floor. The support stand 18 preferably includes four vertical struts 20. Crossbars 22 are preferably used to connect the struts 20 and vertically adjustable feet 24 support each strut 20 from the support surface 26. The feet 24 are preferably individually adjustable in the axial direction to compensate for differences in the height of the support surface 26 to level the frame 16 if the support surface 26 is non-planar and/or tilted.

Figure 4:
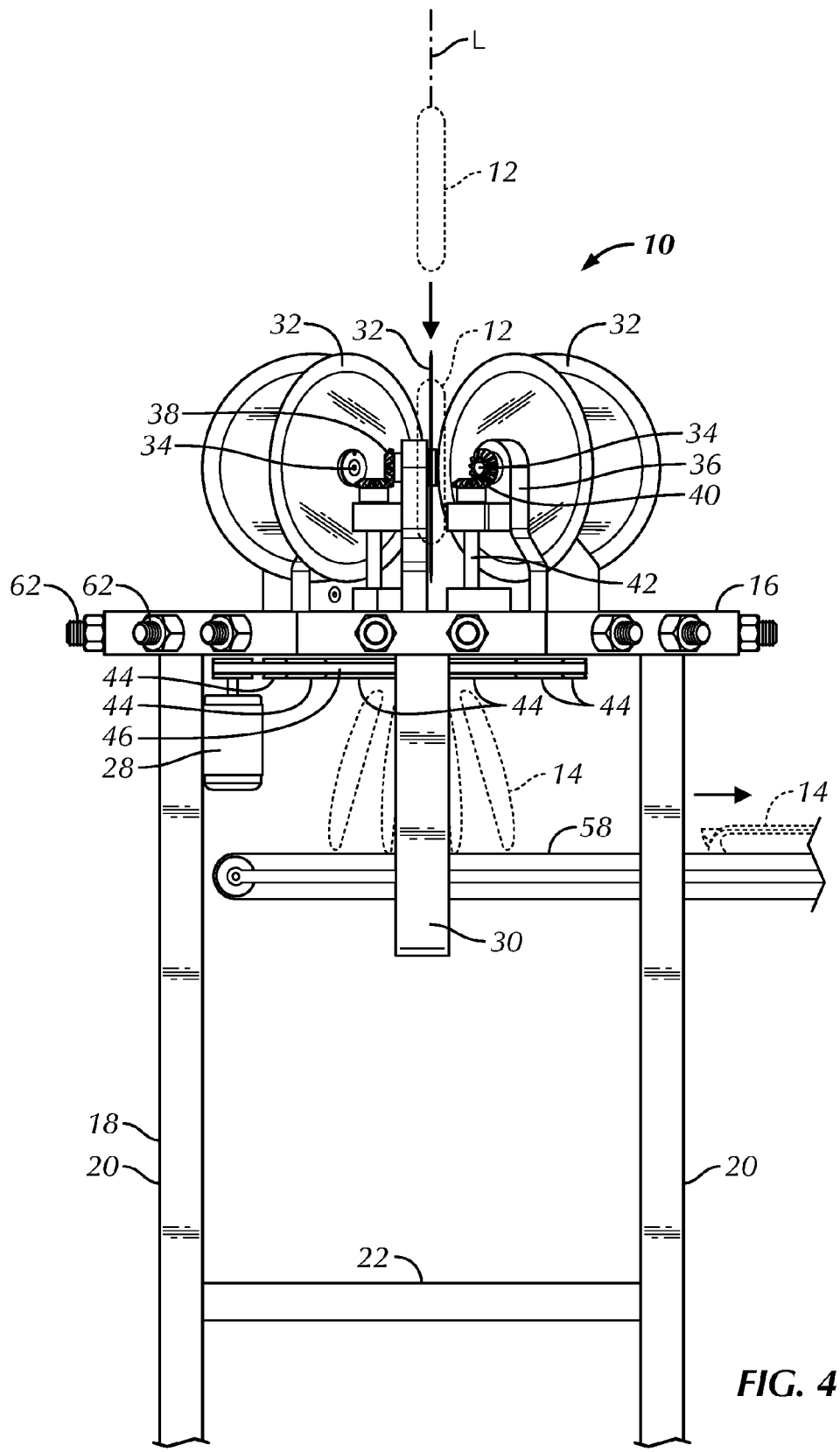
FIG. 4 is a side elevational view of the apparatus shown in FIG. 3 showing in phantom an elongated piece of meat being cut into strips.

Referring to FIG. 4, a motor 28 is located proximate to the frame 16 and is preferably mounted to a support bar (not shown) extending from the frame 16. However, the motor 28 may be mounted directly to the frame 16, the support stand 18 or a separately provided structure (not shown). The apparatus 10 preferably only requires a single electric motor 28 as described further below.

Figure 5A:
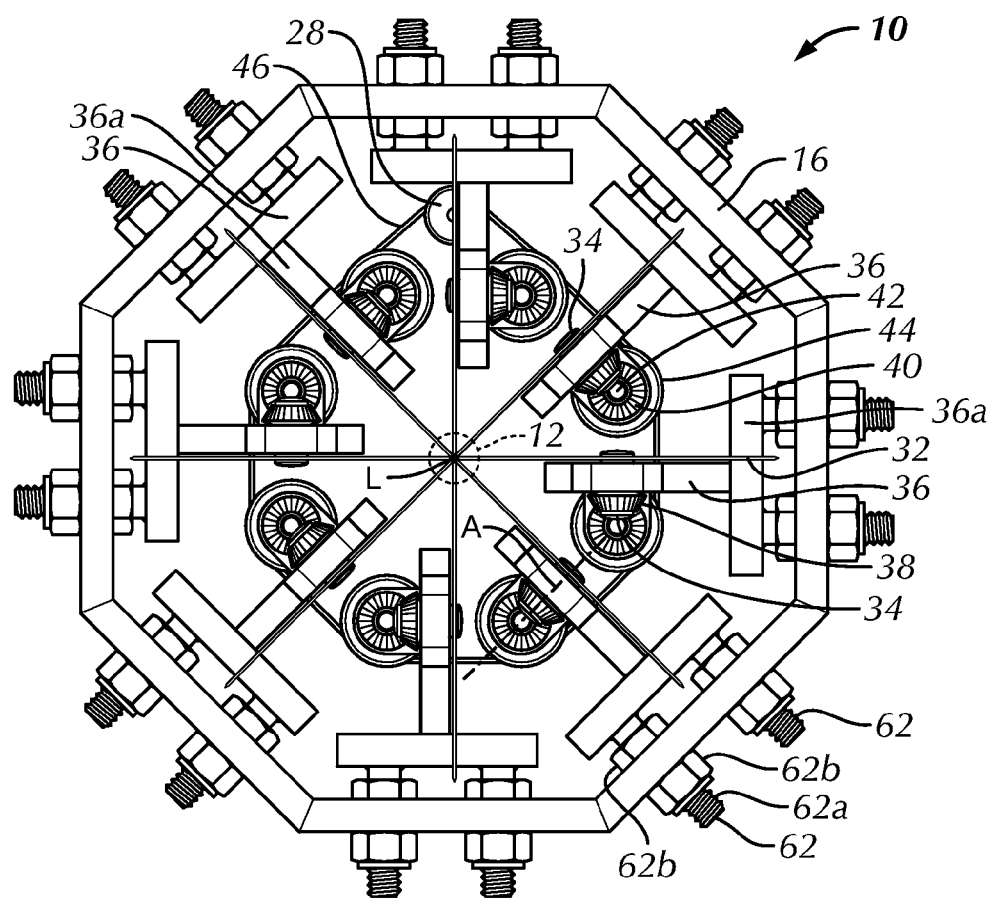
FIG. 5A is a top plan view of the apparatus shown in FIG. 3 with the elongated meat being cut shown in phantom.
Figure 5B:
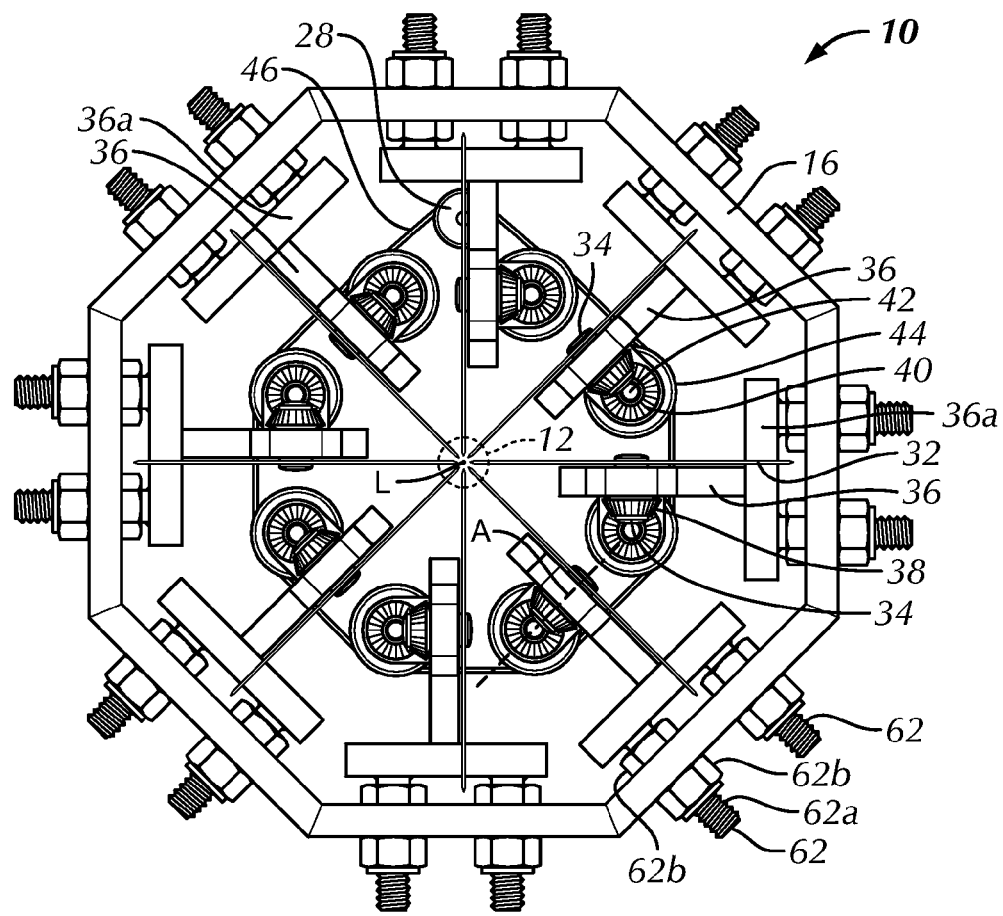
FIG. 5B is a top plan view of the apparatus shown in FIG. 5A with the blades moved to be spaced from the longitudinal axis.

Referring to FIGS. 3, 4 and 5A-5B at least two, but preferably eight, generally circular cutting blades 32 are rotatably mounted to the frame 16 each about its own respective blade axis A (FIGS. 5A and 5B). The blades 32 have a sharpened outer peripheral edge and are preferably formed of hardened stainless steel similar to that used in standard meat cutting blades and have a thickness of approximately 0.125". The thickness of the blades 32 may be varied depending on the type of elongated meat 12 being cut and the speed in which the blades 32 are rotated. The sharpened outer peripheral edge of each blade 32 is preferably smooth but may be jagged or roughened to aid in pulling the elongated meat 12 along the longitudinal axis L.

Each blade axis A is generally perpendicular to the longitudinal axis L and the blades axes A are positioned generally on an imaginary plane generally perpendicular to the longitudinal axis L. As shown in FIG. 5A, each blade 32 is preferably generally tangent to the longitudinal axis L such that the elongated meat 12 is cut into completely separated strips of meat 14 (shown in FIG. 2A) rather than cut grooves into the elongated meat 12. However, the blades 32 may be adjusted to be spaced from the longitudinal axis L (shown in FIG. 5B) such that sections of meat 14a remain attached to an uncut core 14b (shown in FIG. 2B).

Preferably, the blades 32 are equally circumferentially spaced around the longitudinal axis L and the number of blades 32 is equal to the number of strips or sections of meat 14, 14a. In the preferred embodiment, eight blades 32 are equally circumferentially spaced around the longitudinal axis with about a forty five degree angle between each blade 32 and the eight blades 32 cut the elongated meat 12 into eight strips of meat 14 having a pie-shaped cross section. However, the blades 32 need not be equally circumferentially spaced around the longitudinal axis L and/or the blades 32 may be circumferentially spaced around a portion of the longitudinal axis L with the remaining portion being a surface such as a wall (not shown). For example, the wall may be generally parallel to the longitudinal axis L and the blades 32 may be generally tangent to the wall at the longitudinal axis L and circumferentially spaced around the remaining one hundred eighty degrees. In such a configuration, the number of blades 32 does not necessarily equal the number of strips of meat 14 produced. For example, three strips of meat 14 would result from a two blade arrangement cutting against a wall. The blades 32 all preferably rotate at the same speed and in a similar direction such that the portion of the blades 32 closest to the longitudinal axis L are all moving in the same downward direction when the blades 32 are viewed from above the apparatus 10. The symmetry of the blade arrangement helps to center the elongated meat 12 and to cut the elongated meat 12 into generally the equally sized strips of meat 14 shown in FIG. 2A.

Figure 3:
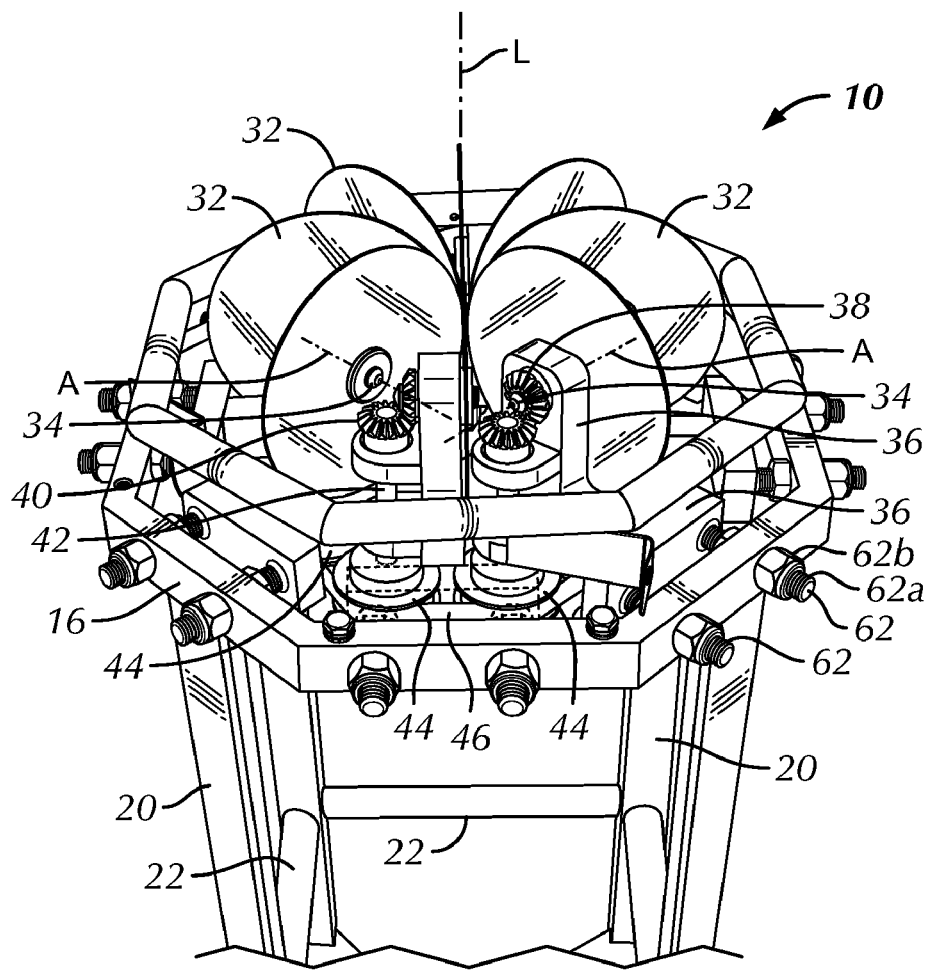
FIG. 3 is a perspective view the apparatus shown in FIG. 1 with the blade cover removed.

Each blade 32 is preferably fixedly mounted to a blade axle 34. Each blade axle 34 is co-linear with and rotates about the respective blade axis A (FIGS. 3, 5A and 5B). Each blade axle 34 is rotatably mounted to the frame 16 through an axle mount 36 having a sleeve bearing 36b. Each axle mount 36 is preferably movably mounted to the frame 16 by at least one, and preferably two, adjustable mounts 62 such that the axle mount 36 and the respective blade 32 is radially adjustable with respect to the frame 16 toward and away from the longitudinal axis L to allow for adjustments if necessary and/or to leave the sections of meat 14a attached to an uncut core 14b (FIG. 5B). Each adjustment mount 62 preferably includes a threaded shaft 62a fixedly mounted to a block 36a and extends through the frame 16. The shaft 62a is preferably secured to the frame 16 by a pair of nuts 62b. However, the axle mounts 36 may be fixedly mounted to the frame 16 or adjustably mounted in a different manner such as through a rack and pinion arrangement. Though it is preferred that the frame 16 have a hoop-type arrangement, the frame 16 may be more of a plate (not shown) with a center opening. Additionally, through the blades 32 are preferably independently adjustable with respect to the longitudinal axis L, the blades 32 may be simultaneously adjustable such that the blades 32 maintain an equal distance from the longitudinal axis L.

Each blade axle 34 includes a first beveled gear 38. Each axle mount 36 is preferably sandwiched between one of the blades 32 and one of the first beveled gears 38. Each first beveled gear 38 is preferably driven by a second beveled gear 40 that is perpendicular to the first beveled gear 38. Each second beveled gear 40 is mounted to a generally vertically extending drive axle 42. Each drive axle 42 is rotatably mounted to the frame 16 by a sleeve bearing (not shown). Each drive axle 42 includes a wheel or belt gear 44 extending axially below the blades 32 and generally rotatable about an axis (not labeled) that is generally parallel with the longitudinal axis L. The belt gears 44 are preferably generally co-planar and equally spaced around the longitudinal axis L to form a generally tangential octagon shape such that a single drive belt 46 contacts and drives all of the belt gears 44 simultaneously to ensure generally equal rotation of all of the blades 32 and requiring only one motor 28 to drive the drive belt 46 (see FIGS. 5A-5B). The drive belt 46 is preferably elastic such that the adjustment of the blades 32 and the belts gears 44 away from the longitudinal axis L is possible without the need for replacing the drive belt 46.

Referring to FIG. 1, the blades 32, the frame 16 and other operating components are preferably covered by a protective blade cover 60. The blade cover 60 is preferably solid, but the blade cover 60 may have openings or be made of a transparent or translucent material such that the blades 32 are visible but human body parts are kept from contacting the blades 32. The blade cover 60 is shown to have a octagon shape to match the shape of the frame 16 but the blade cover 60 may be any preferred shape so long as the rotating blades 32 and other operating components are at least partially covered. A funnel or feed tube 48 preferably extends from the blade cover 60. The feed tube 48 is preferably releasably mounted to the blade cover 60 by a collar clamp 50. However, the feed tube 48 may be fixedly attached or otherwise connected to the blade cover 60. The feed tube 48 is preferably centered around the longitudinal axis L such that elongated meat 12 which is fed into the feed tube 48 is generally aligned with the longitudinal axis L as the elongated meat 12 contacts the blades 32.

A hopper 52 is preferably provided above the feed tube 48 for holding a plurality of elongated meat pieces 12 to be cut. Though shown unattached, the hopper 52 may be attached to the blade cover 60 or frame 16. The hopper 52 preferably includes a bounce guard 54 that prevents the elongated meat 12 from falling out of alignment while the hopper 52 sequentially feeds the elongated meat 12 into the apparatus 10. The hopper 52 preferably uses gravity to advance the elongated meat pieces 12. A dispensing piston 56 preferably slides horizontally back and forth to urge the bottommost elongated meat piece 12 into the feed tube 48. Though a hopper 52 is preferred to feed the elongated meat 12 into the apparatus 10, the elongated meat 12 can be fed into the apparatus 10 by any suitable method such as by being hand fed, using a conveyor feed (not shown) or a dispensing roller (not shown).

Once the elongated meat 12 is fed into the feed tube 48 and contacts the blades 32, the elongated meat 12 is brought into co-linear alignment with the longitudinal axis L and the blades 32 pull the elongate meat 12 along the longitudinal axis L. Since gravity in addition to the rotation of the blades 32 is used to help to pull the elongated meat 12 through the blades 32, the longitudinal axis L is preferably vertical (i.e. perpendicular to the support surface). However, the longitudinal axis L may be angled or horizontal and rely on the blades 32 to pull the elongated meat 12 through and/or have the dispensing piston 56 or other device urge the elongated meat 12 through the blades 32. As the elongated meat 12 is pulled through the blades 32, the blades 32 cut the elongated meat 12 into the strips of meat 14.

Referring to FIGS. 1 and 4, once the elongated meat 12 is cut into strips of meat 14, the strips of meat 14 fall onto a conveyor belt 58. The conveyor belt 58 preferably extends underneath the blades 32 and is mounted to the support stand 18. However, the conveyor belt 58 need not be connected to the support stand 18. The force of the fall of the strips of meat 14 onto the conveyor belt 58 helps to ensure that any un-separated strips of meat 14 are completely separated for further processing. Preferably, the conveyor belt 58 is a vibratory conveyor that sufficiently separates and arranges the strips of meat 14 to allow the strips of meat 14 to be directly transferred through sequential battering, breading and cooking stations (not shown). Alternatively, the sections of meat 14a may stay connected to the uncut core 14b. Though use of a conveyor belt 58 is preferred to move the strips of meat 14 from the blades 32, the strips of meat 14 could instead be collected in a container (not shown) for later transport and processing.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

We claim:

1. An apparatus for cutting elongated meat, the apparatus comprising:
   a frame having a longitudinal axis;
   a motor proximate the frame;
   at least two generally circular blades rotatably mounted to the frame each about a respective blade axis, each blade being equally circumferentially spaced around the longitudinal axis to provide an opening adapted to receive the elongated meat and each blade axis generally perpendicular to the longitudinal axis, the blades axes positioned generally on an imaginary plane generally perpendicular to the longitudinal axis, the blades rotated by the motor and cutting the elongated meat when the elongated meat is placed generally collinear with the longitudinal axis and contacts the blades.

2. The apparatus according to claim 1, wherein each blade is in operative engagement with a first beveled gear driven by a second beveled gear mounted to the frame, the second beveled gear being generally perpendicular to the first beveled gear.

3. The apparatus according to claim 2, wherein each blade includes an axle mounted to the frame by a sleeve bearing, each axle having one of the first beveled gears and one of the blades on either side of one of the sleeve bearings.

4. The apparatus according to claim 2, wherein each second beveled gear is driven by a belt gear, the belt gears being driven by a drive gear that is driven by the motor.

5. The apparatus according to claim 1, wherein each blade is generally tangent to the longitudinal axis such that the elongated meat is cut into at least two separate elongated strips of meat of equal size.

6. The apparatus according to claim 1, wherein each blade is radially spaced from the longitudinal axis such that the elongated meat is slit to an uncut central core.

7. The apparatus according to claim 1, wherein each blade is radially adjustable with respect to the frame toward and away from the longitudinal axis.

8. The apparatus according to claim 1, wherein the frame includes a support stand.

9. The apparatus according to claim 1 further comprising a conveyor belt extending below the blades to catch and transport the strips of meat.

10. The apparatus according to claim 1 further comprising a hopper above the blades to feed a plurality of elongated meat pieces to be cut one at a time through the blades.

11. The apparatus according to claim 1, wherein the at least two blades includes eight blades equally circumferentially spaced from each other around the longitudinal axis.

12. An apparatus for cutting elongated meat, the apparatus comprising:
    a frame having a longitudinal axis;
    a plurality of generally circular blades rotatably mounted to the frame each about a respective blade axis, each blade equally circumferentially spaced around the longitudinal axis to provide an opening adapted to receive the elongated meat and each blade axis being generally perpendicular to the longitudinal axis, the blade axes positioned generally on an imaginary plane generally perpendicular to the longitudinal axis, the blades being generally equally spaced around the longitudinal axis and each rotating in a direction to pull the elongated meat along the longitudinal axis, the blades cutting the elongated meat as the elongated meat travels along the longitudinal axis.

13. The apparatus according to claim 12 further comprising an electric motor, the electric motor driving a plurality of first beveled gears, each first beveled gear driving a corresponding second beveled gear operatively connected to one of the blades.

14. The apparatus according to claim 13, wherein the first beveled gears are each connected to a drive gear, the drive gears connected to a belt driven by the motor.

15. The apparatus according to claim 12, wherein each blade is generally tangent to the longitudinal axis such that the elongated meat is cut into at least two separate elongated strips of meat.

16. The apparatus according to claim 12, wherein each blade is radially spaced from the longitudinal axis such that the elongated meat is slit to an uncut central core.

17. The apparatus according to claim 12, wherein each blade is radially adjustable with respect to the frame toward and away from the longitudinal axis.

18. An apparatus for cutting elongated meat, the apparatus comprising:
   a frame having a longitudinal axis;
   eight generally circular blades rotatably mounted to the frame about a respective axis on respective axle, each axle having a first beveled gear, each blade axis being generally perpendicular to the longitudinal axis, the blade axes positioned generally on an imaginary plane generally perpendicular to the longitudinal axis, the blades generally equally circumferentially spaced around the longitudinal axis at approximately a forty five degree angle from each adjacent blade to provide an opening adapted to receive the elongated meat and each blade rotating in a direction to pull the elongated meat along the longitudinal axis; and
   eight drive axles rotatably mounted to the generally parallel to the longitudinal axis, each drive axle having a second bevel gear drivingly connected to a respective first bevel gear, each drive axle having a belt gear, the belt gears rotatably driven by a belt.

19. The apparatus according to claim 18, wherein each blade is generally tangent to the longitudinal axis such that the elongated meat is cut into eight separate elongated strips of meat.

20. The apparatus according to claim 18, wherein each blade is radially spaced from the longitudinal axis such that the elongated meat is slit eight times leaving an uncut central core.

21. The apparatus according to claim 18, wherein each drive axle is radially adjustable with respect to the frame toward and away from the longitudinal axis.

22. An apparatus for cutting elongated meat, the apparatus comprising:
   a frame having a longitudinal axis;
   a protective blade cover associated with said frame, the cover having a feed tube adapted to receive the elongated meat;
   eight generally circular blades rotatably mounted to the frame and positioned beneath the cover about a respective axis on respective axle, each axle having a first beveled gear, each blade axis being generally perpendicular to the longitudinal axis, the blade axes positioned generally on an imaginary plane generally perpendicular to the longitudinal axis, the blades generally equally circumferentially spaced around the longitudinal axis at approximately a forty five degree angle from each adjacent blade to provide an opening adapted to receive the elongated meat and each blade rotating in a direction to pull the elongated meat along the longitudinal axis;
   eight drive axles rotatably mounted to the generally parallel to the longitudinal axis, each drive axle having a second bevel gear drivingly connected to a respective first bevel gear, each drive axle having a belt gear, the belt gears rotatably driven by a belt;
   a support stand associated with said frame; and
   a conveyor belt positioned within the support stand beneath the frame that is adapted to receive the elongated meat subsequent to cutting by the blades.

* * * * *